(12) United States Patent
Mattheus et al.

(10) Patent No.: US 8,254,789 B2
(45) Date of Patent: Aug. 28, 2012

(54) DEVICE AND METHOD FOR ADJUSTING CHROMATIC DISPERSION

(75) Inventors: Arnold Mattheus, Muenster (DE); Yutaka Miyamoto, Yokohama (JP); Masahito Tomizawa, Yokosuka (JP)

(73) Assignees: Deutsche Telekom AG, Bonn (DE); Nippon Telegraph and Telephone Corporation, Tokyo (JP)

( * ) Notice: Subject to any disclaimer, the term of this patent is extended or adjusted under 35 U.S.C. 154(b) by 988 days.

(21) Appl. No.: 10/530,628

(22) PCT Filed: Sep. 23, 2003

(86) PCT No.: PCT/DE03/03167
§ 371 (c)(1), (2), (4) Date: Mar. 20, 2006

(87) PCT Pub. No.: WO2004/034612
PCT Pub. Date: Apr. 22, 2004

(65) Prior Publication Data
US 2006/0193637 A1    Aug. 31, 2006

(30) Foreign Application Priority Data
Oct. 7, 2002   (DE) .................................. 102 46 658

(51) Int. Cl.
*H04B 10/00* (2006.01)

(52) U.S. Cl. ........................ 398/159; 398/158; 398/147
(58) Field of Classification Search .................. 398/29, 398/81, 119, 136, 147, 158, 159
See application file for complete search history.

(56) References Cited

U.S. PATENT DOCUMENTS

| | | | | |
|---|---|---|---|---|
| 5,570,439 | A * | 10/1996 | Ido et al. | 385/37 |
| 5,793,917 | A * | 8/1998 | Yoshimura | 385/100 |
| 6,771,904 | B1 * | 8/2004 | Sasaki et al. | 398/25 |
| 2001/0048539 | A1 * | 12/2001 | Kubo et al. | 359/161 |
| 2001/0048798 | A1 * | 12/2001 | Sasaoka et al. | 385/123 |
| 2002/0006257 | A1 * | 1/2002 | Danziger et al. | 385/123 |
| 2003/0081891 | A1 * | 5/2003 | Schneider et al. | 385/27 |

FOREIGN PATENT DOCUMENTS

| | | |
|---|---|---|
| CA | 2 302 986 | 7/2000 |
| EP | 0 607 782 | 7/1994 |
| EP | 1 073 221 | 1/2001 |

* cited by examiner

*Primary Examiner* — Dzung Tran
(74) *Attorney, Agent, or Firm* — Kenyon & Kenyon LLP

(57) ABSTRACT

A device and method for adjusting the chromatic dispersion in an optical transmission system includes an optical element having a temperature-dependent chromatic dispersion. The device and method further include a device for adjusting a temperature or a temperature distribution of at least one region of the optical element for providing a predefined chromatic dispersion of the optical element. Therefore, the chromatic dispersion of the optical element may be regulated along an optical transmission path.

20 Claims, 3 Drawing Sheets

DEVICE AND METHOD FOR ADJUSTING CHROMATIC DISPERSION

FIELD OF THE INVENTION

The present invention relates generally to the compensation and monitoring of chromatic dispersion in optical systems. In particular, the invention relates to a device and method for adjusting chromatic dispersion.

BACKGROUND OF THE INVENTION

Chromatic dispersion (CD) in optical fibers or other optical components is a widespread physical phenomenon that generally occurs during the transmission of optical signals in dispersive media.

In highly developed optical transmission systems, chromatic dispersion becomes relevant as an interfering effect, for example, at high transmission rates or great optical transparency lengths. To reduce the chromatic dispersion, which is accumulated along an optically transparent transmission path, it is known to insert dispersion-compensating elements into the transmission paths. Among other things, dispersion-compensating fibers (DCFs) or chirped fiber gratings are used for that purpose.

Problematical, however, in the compensation of chromatic dispersion is that in general, it has no constant value for a given transmission length, but rather is subject to changes over time. In addition to being triggered by other environmental influences, such changes are also triggered by, inter alia, temperature fluctuations, since the chromatic dispersion of optical components such as glass fibers is temperature-dependent.

These changes in the chromatic dispersion are relatively small, so that the change in signal quality caused by them is generally negligible in transmission systems currently installed.

In the case of newer, highly developed transmission systems, for instance, those with data transmission rates above 10 GBit/s or very long transmission paths, however, these changes already have a very disruptive effect on the optical signal quality. For such transmission systems, methods for automatic or adaptive dispersion compensation (ADC) are therefore considered to be absolutely necessary.

Some ADC implementation techniques are already known. A device for ADC proposed by K. Yamane in "New functionalities for advanced optical interfaces (dispersion compensation)", workshop on IP/optical in Chitose, Japan, Jul. 9-11, 2002 is based on an optical circulator in conjunction with a complex free-beam optical system having six partially mechanically adjustable optical components. However, this design approach is very costly. In addition, its long-term stability is doubtful.

SUMMARY OF THE INVENTION

Therefore, one object of the present invention is to simplify the compensation of chromatic dispersion. This objective is achieved by a device, an optical transmission system, as well as a method described herein.

Accordingly, a device of the present invention for adjusting chromatic dispersion in an optical transmission system includes an optical element having a temperature-dependent chromatic dispersion, as well as a device for adjusting a temperature or a temperature distribution of at least one region of the optical element for providing a predefined chromatic dispersion of the optical element.

This unit includes an optical element with temperature-dependent chromatic dispersion. A device for adjusting a temperature or a temperature distribution represents a new type of component which, in the following, is also called an optical chromatic dispersion control element using temperature control (OCET).

In addition, the present invention includes an optical transmission system having at least one OCET installed between a transmitter and a receiver in the optical path of the transmission system. Compensation may be made for fluctuations of the chromatic dispersion by suitable adjustment of the OCET.

The same effect, which essentially leads to fluctuations of the chromatic dispersion in optical transmission systems over time, namely, the temperature fluctuations to which the optical elements of the transmission system are exposed, are thus utilized in a surprisingly simple manner by the present invention to permit adjustment of predetermined values of the chromatic dispersion along the transmission link.

According to the method of the present invention for adjusting the chromatic dispersion in an optical transmission system, a predetermined temperature or a temperature distribution of at least one region of the optical element is adjusted so that the optical element exhibits a predetermined chromatic dispersion.

In this context, by adjusting the temperature or the temperature distribution, the chromatic dispersion of the optical element may preferably be adjusted in such a way that the chromatic dispersion of the transmission link is compensated. In the same way, however, it is also possible to set the dispersion to a specific value. This is useful, for example, when additional elements for compensation of the chromatic dispersion are inserted along the optical path. In addition, using an OCET, the chromatic dispersion of the entire transmission system can also be set in targeted fashion to a value other than zero, or a value range can be traversed or tuned, in order, for example, to test the tolerance of the optical transmission system with respect to fluctuations of the chromatic dispersion, i.e., the influence of such fluctuations on the signal quality and transmission quality.

The device for adjusting a temperature or temperature distribution may advantageously include a temperature chamber. It is thereby possible to adjust the ambient temperature of the optical element so that the temperature difference between the optical element and the surroundings disappears. In this way, the temperature or the temperature distribution of the optical element, and consequently the OCET, may be well stabilized.

Moreover, in particularly simple and preferred manner, the temperature of the optical element may be changed using a heating device. In this case, the optical element is advantageously designed so that at room temperature, it then overcompensates the value of the chromatic dispersion of the transmission system to be reached or adjusted, so that in response to suitable temperature increase, the desired value can be reached. To that end, the optical element may advantageously include a material which exhibits a dispersion coefficient that has an inverted sign compared to the dispersion coefficient of the optical transmission system. An overcompensation may then be achieved precisely by the use of such a material.

In addition, adjustment of a predetermined chromatic dispersion of the optical element may be achieved if the optical element includes a material which exhibits an essentially monotonic or even linear dependence of the chromatic dispersion on the temperature. A definite temperature value may be assigned to each chromatic dispersion within the adjustable value range.

As already mentioned above, the effect of the temperature dependence of the chromatic dispersion is very small. To be able to achieve sufficiently great compensation, it is therefore advantageous if the light travels a path of the greatest length possible within the temperature-influenced material of the optical element. It is possible to achieve this by using an optical fiber, such as a glass fiber, as an optical element. It can then also be wound up, thus saving space.

In addition, optical transmission systems are predominantly based on signal transmission through glass fibers. In such systems, the transmission fibers may then be coupled to the glass fiber of the OCET by low-loss splicing, for example.

To stabilize the adjusted chromatic dispersion, it is especially advantageous if the device for adjusting a temperature or temperature distribution includes a thermostat device which ensures that the adjusted temperatures are maintained. A device for measuring the ambient temperature of at least one section of the optical element can also be advantageous, in order to provide a controlled variable for the temperature stabilization. For example, this is beneficial when a temperature chamber is used whose inside temperature represents a good and exact average value for the temperature of the optical element arranged in the chamber.

In one embodiment, the chromatic dispersion of the OCET is not only adjusted, but also controlled. To that end, the device for adjusting a temperature or temperature distribution advantageously includes a temperature-control device. To control the temperature or the temperature distribution of the optical element, various parameters may be used which are processed by the temperature-control device.

To achieve an adaptive dispersion compensation or stabilization, preferably the chromatic dispersion in the optical transmission system or a section thereof is measured, and the temperature or temperature distribution of the optical element of the OCET is adjusted as a function of the measurement. To that end, for instance, the OCET itself may include a device for measuring the chromatic dispersion, whose measured values can then be used directly for temperature control by the temperature-control device.

However, such a measuring device may equally also be a component of the optical transmission system outside of the OCET, and may transfer the measured values or signals corresponding to them to the OCET. The temperature-control device of the OCET is then able to regulate the temperature, and therefore the chromatic dispersion of its optical element, as a function of such a signal.

The chromatic dispersion in the optical transmission system may also be ascertained indirectly by measuring the temperature at at least one location in the optical transmission system, if the dependence of the chromatic dispersion in the optical transmission system on the temperature is known.

One possibility for directly determining the existing chromatic dispersion of at least one section of the transmission system may be, for example, to feed a test signal using a suitable device and evaluating the test signal. After passing through at least one portion of the transmission system, the test signal may then be evaluated by a device for measuring the chromatic dispersion. The measurement of the differential phase shift of wavelength-modulated test signals is especially suitable for this purpose.

Particularly in the case of long transmission links, it can also be advantageous if several OCETs are disposed in the transmission system. For example, one OCET may be arranged in each case in a section of the transmission system between two amplifiers. Accordingly, if a plurality of OCETs are arranged one after the other along the optical path, then their adjustments influence one another. Correspondingly, it is advantageous if the temperature or temperature distribution of one optical element having a temperature-dependent chromatic dispersion is adjusted as a function of the adjustment of at least one further element having a temperature-dependent chromatic dispersion in the optical transmission system, in order to coordinate the adjustments of the optical elements of the OCETs with one another. For example, the OCETs may be interconnected, and thus their adjustments coordinated among themselves. This may advantageously be accomplished via an optical monitoring channel, for instance. The OCETs may advantageously be connected via such a monitoring channel to a computing device for ascertaining the adjustments of the devices. The computing device can then transmit the respective adjustment parameters via the monitoring channel in accordance with the most beneficial adjustments of the OCETs ascertained.

In order to realize higher transmission bandwidths, often a plurality of transmission fibers in an optical transmission system are routed in parallel. If the individual branches of such a transmission system exhibit different fluctuations in the chromatic dispersion, then in this case, a plurality of OCETs which provide individual stabilization of individual branches may advantageously be operated in parallel. Frequently, however, the fluctuations of the individual branches will also be essentially equal, since, for example, in the case of a dispersion fluctuation triggered by a change in temperature, the temperature changes essentially result along the optical path, and for the most part are negligible between the individual fibers. One advantage in this case is a further refinement of the device according to the present invention in which the OCET includes at least two optical elements having separate inputs and outputs, which are thus not arranged one after the other along an optical path, and which exhibit a temperature-dependent, chromatic dispersion. The chromatic dispersion of these elements can then be adjusted together by a joint temperature adjustment using the device for adjusting the temperature or temperature distribution.

The present invention is described in further detail in the following on the basis of exemplified specific embodiments, with reference to the attached drawing. In this context, identical reference numerals refer to identical or similar parts.

DETAILED DESCRIPTION

Figure 1A:
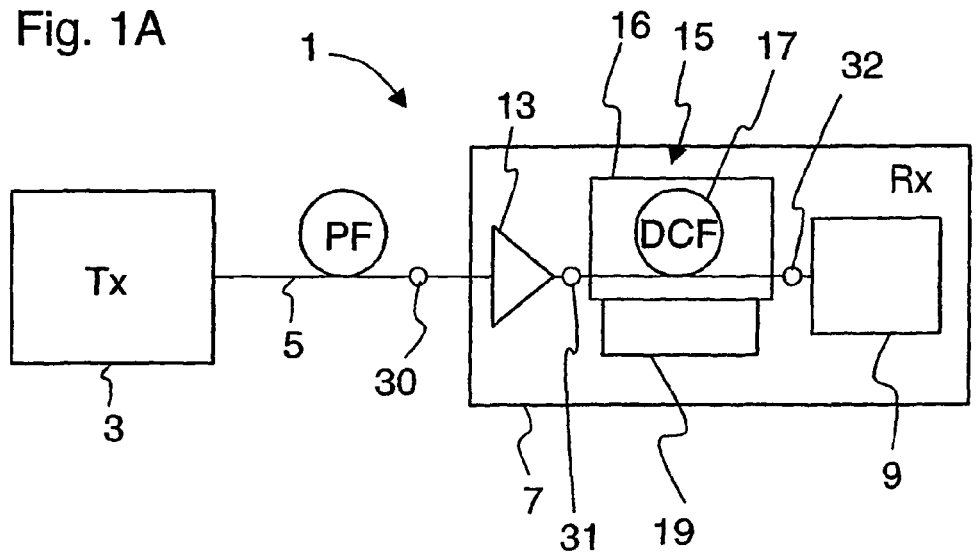
FIGS. 1A to 1C illustrate varying embodiments of optical transmission links with stabilization or adjustment of the chromatic dispersion by OCETs.
Figure 1B:
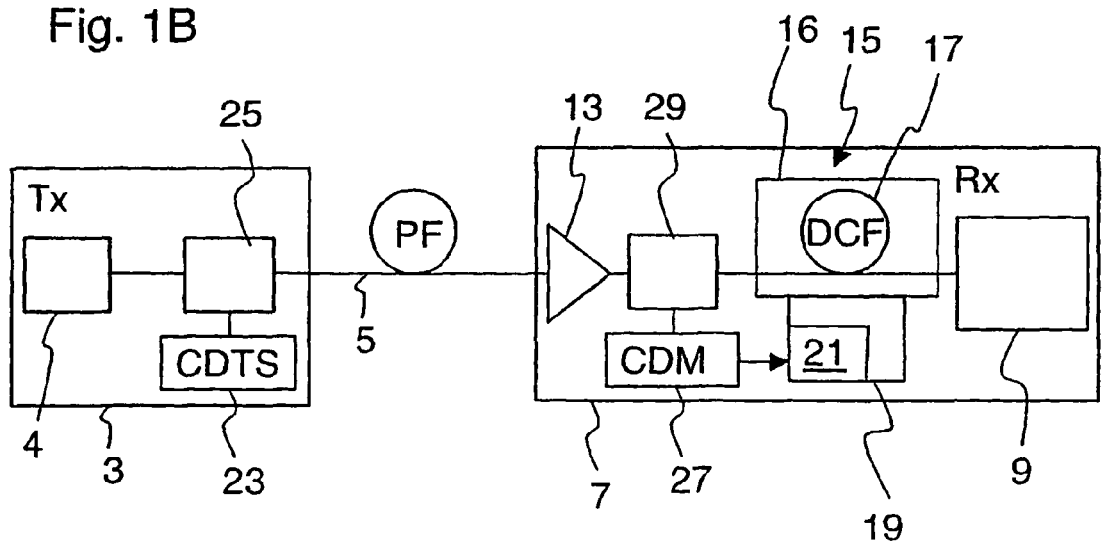
Figure 1C:
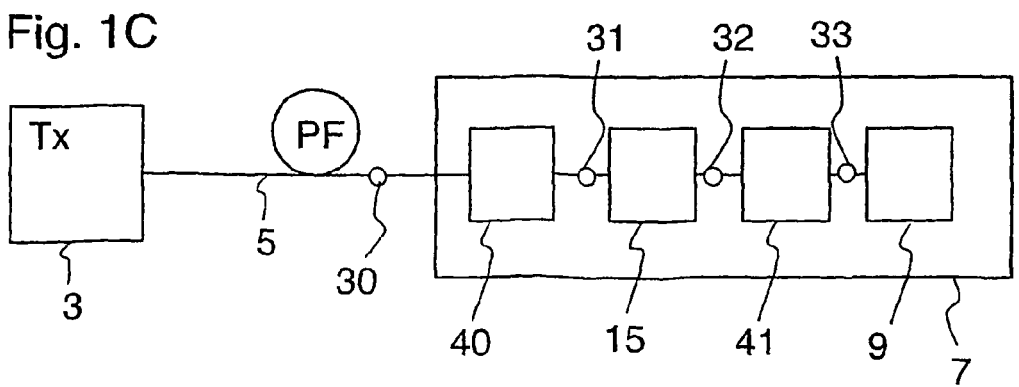

FIGS. 1A through 1C show varying exemplary embodiments of optical transmission links, designated as a whole by 1, with use of OCETs, which are described in the following.

FIG. 1A shows a first exemplary embodiment of an optical transmission link 1 with stabilization of the chromatic dispersion by an OCET 15. Transmission link 1 includes a transmitter 3, a transmission fiber 5 and a receiver 7. Receiver 7 of the optical transmission link 1 includes a detector 9 for detecting the transmitted optical signals, as well as an optional optical amplifier 13, such as a fiber booster.

An OCET, designated as a whole by 15, is arranged in the optical path between optical amplifier 13 and the detector 9. The OCET includes an optical element having a temperature-dependent chromatic dispersion in the form of a dispersion-compensating fiber 17, which is disposed within a temperature chamber 16, as well as a device 19 for adjusting a temperature or a temperature distribution of at least one region of the optical element, which in the following is designated as temperature-regulating device. It may include a heating device for adjusting a predefined temperature within the temperature chamber. By adjusting a specific temperature, it is thus possible to provide a predefined chromatic dispersion of dispersion-compensating fiber 17.

The optical data signals transmitted between transmitter 3 and detector 9 are subject a priori to no restricting boundary conditions. Thus, for example, optical single-channel signals or even multi-channel signals, i.e., wavelength division multiplexing (WDM) signals, may be transmitted.

The total chromatic dispersion $<D_{tot}>$ between transmitter and detector is made up essentially of the dispersion components of the dispersion $<D_p>$ of optical transmission fiber 5, the dispersion $<D_{OA}>$ of the optical amplifier and the dispersion $<D_c>$ of dispersion-compensating fiber 17 of OCET 15. Thus, it holds that:

$$<D_{tot}> = <D_p> + <D_{OA}> + <D_c> \quad (1)$$

For example, total chromatic dispersion $<D_{tot}>$ may be set by compensating elements, inserted into the optical path during system installation, to an acceptable value which yields a sufficiently good optical signal quality at the input of detector 9.

Equation No. 1 is an exemplary equation because an optical transmission link can also have other, particularly also more optical elements, which exhibit temperature-dependent chromatic dispersion. However, the individual components of the dispersion may be subject to fluctuations $<\Delta D_p>$, $<\Delta D_{OA}>$ and $<\Delta D_c>$ over time, so that a generally time-dependent total deviation of the chromatic dispersion results.

$$<\Delta D_{tot}> = <\Delta D_p> + <\Delta D_{OA}> + <\Delta D_c> \quad (2)$$

Fluctuations in the chromatic dispersion of optical transmission fiber 5 and of optical amplifier 13 may be caused by altered ambient conditions. For example, the ambient temperature of one or more components may change, for instance, between day and night or summer and winter. Even changes not caused by temperature, for instance, due to fluctuations of the mechanical stress can lead to fluctuations in the chromatic dispersion.

It is now possible to stabilize the generally time-dependent fluctuations $<\Delta D_p>$ und $<\Delta D_{OA}>$ of the chromatic dispersion of the optical transmission fiber and amplifier with the aid of OCET 15, in that the temperature of dispersion-compensating fiber 17 is so adjusted by device 19 that it holds that:

$$<\Delta D_c> = -(<\Delta D_p> + <\Delta D_{OA}>), \quad (3)$$

so that $$<\Delta D_{tot}> = 0 \quad (4)$$

is achieved.

In this context, the chromatic dispersion can be stabilized so that the value of $<D_{tot}>$ is constant. Advantageously, the chromatic dispersion can also be compensated so that $<D_{tot}>$ assumes the smallest value possible or even disappears.

In the following, it is explained how the temperature of an optical element of an OCET, like in particular a dispersion-compensating optical fiber, may be adjusted in order to achieve a predefined chromatic dispersion of the optical element.

The change $<\Delta D>$ in the chromatic dispersion of an optical fiber as a function of temperature change $\Delta T$ may be expressed with close approximation by the following equation:

$$<\Delta D> = (dD/d\lambda) \cdot (d\lambda_0/dT) \cdot L \cdot \Delta T. \quad (5)$$

In this context, D denotes the dispersion coefficient, L the length of the optical fiber, $\lambda$ the wavelength and $\lambda_0$ the zero-dispersion wavelength. This equation may be written more simply as:

$$<\Delta D> = S_0 \cdot M_0 \cdot L \cdot \Delta T. \quad (6)$$

In this case, $S_0 = (dD/d\lambda)$ is the rise and $M_0 = (d\lambda_0/dT)$ is the temperature coefficient of the chromatic dispersion.

Thus, when working with a glass fiber having a given length L, the change $<\Delta D>$ in the chromatic dispersion and temperature change $\Delta T$ are approximately proportional to one another.

In the following, it is further shown how a change in chromatic dispersion $<\Delta D_p>$ of an optical transmission fiber may be compensated for by an OCET, and thus the chromatic dispersion of the transmission system may be stabilized. In this context, subscript "P" denotes variables of the transmission fiber and subscript "C" denotes variables of the optical element of the OCET, using a dispersion-compensating fiber as an example. Furthermore, subscript "0" denotes initial values.

The total dispersion $<\Delta D_{tot}>$ of both glass fibers is to be stabilized to an initial value $$<D_{tot,0}> = <D_{p,0}> + <D_{c,0}>, \quad (7)$$

so that the difference between instantaneous total dispersion $<D_{tot}(t)>$ and initial total dispersion $<D_{tot,0}>$ is regulated to zero. Expressed differently, the sum of the changes in the chromatic dispersion of both glass fibers should be equal to zero, thus:

$$<\Delta D_p> + <\Delta D_c> = 0. \quad (8)$$

From equation (6), resulting from this is:

$$\Delta T_c = -<\Delta D_p>/(S_{0,c} \cdot M_c \cdot L_c). \quad (9)$$

As dispersion-compensating optical element of the OCET, any glass fiber may be used by which the fluctuations $<\Delta D_p>$ occurring may be post-controlled in accordance with equation (9) by temperature change.

The desired total dispersion may be expressed as real multiple $\epsilon$ of $<\Delta D_p>$, thus by $<D_{tot,0}> = \epsilon \cdot <\Delta D_{p,0}>$. Moreover, the chromatic dispersion of a glass fiber is the product of dispersion coefficient D and length L, so that it holds that:

$$<D_{tot,0}> = \epsilon \cdot <\Delta D_{p,0}> = D_P \cdot L_P + D_c \cdot L_c. \quad (10)$$

The dispersion coefficients of the two optical fibers are denoted by $D_p$ and $D_c$. Together with equation (9), ultimately following therefrom is:

$$\Delta T_c = \Delta T_P \cdot (M_{0,P}/M_{0,c}) \cdot (D_c/S_{0,c}) \cdot ([1 - \epsilon]D_p/S_{0,P})^{-1}. \quad (11)$$

In the event that no residual dispersion, $<D_{tot,0}> = \epsilon = 0$ and equation (11) becomes $$\Delta T_c = \Delta T_P \cdot (M_{0,P}/M_{0,c}) \cdot (D_c/S_{0,c}) \cdot (D_p/S_{0,P})^{-1}. \quad (12)$$

If the intention is to stabilize the chromatic dispersion of an optical transmission link, then the temperature must thus be adjusted according to equation (12). If the dispersion is even to be compensated by an OCET, then the temperature of the optical element of the OCET may be adjusted according to equation (12). If, for example, the temperature of the optical transmission fiber is measured, then resulting from equation (11) and equation (12), respectively, is a specific temperature difference DT. The dispersion-compensating fiber of the OCET has the temperature difference DT for stabilizing or compensating the dispersion so that its temperature to be adjusted is calculated from the temperature of the optical transmission fiber plus the temperature difference according to the above equations.

Temperature coefficient $M_0$ is a function of the material of the optical element of the OCET and typically lies between 0.0026 nm/° K and 0.03 nm/° K. Values for temperature coefficients of suitable materials are indicated, inter alia, in K. S. Kim et al., "Temperature dependence of chromatic dispersion in dispersion shifted fibers; experiment and analysis", Journal Appl. Phys. 73, pages 2069-2074, 1993. Typical values for dispersion coefficients D and rises $S_0$ by 1550 nm wavelength are given in the following table for standard single-mode fibers and for several types of dispersion-compensating fibers:

|  | D [ps/(nm · km)] | $S_0$ [ps/(nm² · km)] | $D/S_0$ [nm] |
|---|---|---|---|
| standard single-mode fiber | 17 | 0.057 | 298 |
| dispersion-compensating fiber 1 | −48.6 | +0.053 | −917 |
| dispersion-compensating fiber 2 | −50.8 | −0.154 | 330 |
| dispersion-compensating fiber 3 | −100 | −0.3 | 330 |

The values indicated in the table for the standard single-mode fiber and dispersion-compensating fiber 3 are taken from the above-cited publication of K. S. Kim et al., and the values of the two other dispersion-compensating fibers are taken from T. Kato, Y. Koyano, M. Nishimura, "Temperature dependence of chromatic dispersion in various types of optical fiber", Opt. Lett., Vol. 25, No. 16, pages 1156-1158, 2000.

If the chromatic dispersion of the optical components changes frequently, it is advantageous if the temperature-regulating device includes a temperature-control device, with a fixed value of the temperature of fiber 17 is adjustable and regulates its temperature as a function of measured quantities. Thus, in particular, the chromatic dispersion may be measured at one or more of the measuring points 30, 31, 32 marked in FIG. 1A, using a suitable device. Signals corresponding to the measured values may then be transferred to the temperature-control device which then adjusts the temperature of dispersion-compensating fiber 17 as a function of these signals.

The chromatic dispersion may also be determined indirectly. For example, the chromatic dispersion in the optical transmission system 1 may be ascertained by measuring the temperature at at least one of the measuring points 30, 31, 32 in the optical transmission system. From a calibration measurement, in each case a chromatic dispersion may then be assigned to the measured temperature values. Naturally, such a type of indirect measurement only takes into account changes of the chromatic dispersion because of temperature fluctuations to which the optical elements of the transmission system are subject.

FIG. 1B shows another exemplary embodiment of a dispersion-stabilized transmission link. In this exemplary embodiment, temperature-regulating device 19 of the OCET includes a temperature-control device 21. Transmitter 3 includes an optical signal source 4 for converting data into optical signals, as well as a test-signal generator 23. The signals of optical signal source 4 and test-signal generator 23 are coupled by a coupler 25 and transmitted together via optical transmission fiber 5. The test-signal generator generates a test signal used for measuring the chromatic dispersion.

In addition to optical amplifier 13, OCET 15 and detector 9, in this embodiment, receiver 7 also includes a coupler 29 for decoupling the test signal and the optical data signals. The decoupled data signals are conducted further along the optical path via OCET 15 to detector 9. The test signals are conducted from coupler 29 to a CD monitor, i.e., a measuring device 27 for measuring the chromatic dispersion, which, based on these test signals, determines the chromatic dispersion of the transmission-link section lying between signal source 4 and coupler 29. The measured values may then be converted into corresponding signals which are transferred to temperature-control device 21 that, as a function of these signals, i.e., the measured values corresponding to them, adjusts the temperature of fiber 17 so that it exhibits a specific chromatic dispersion.

Figure 2:
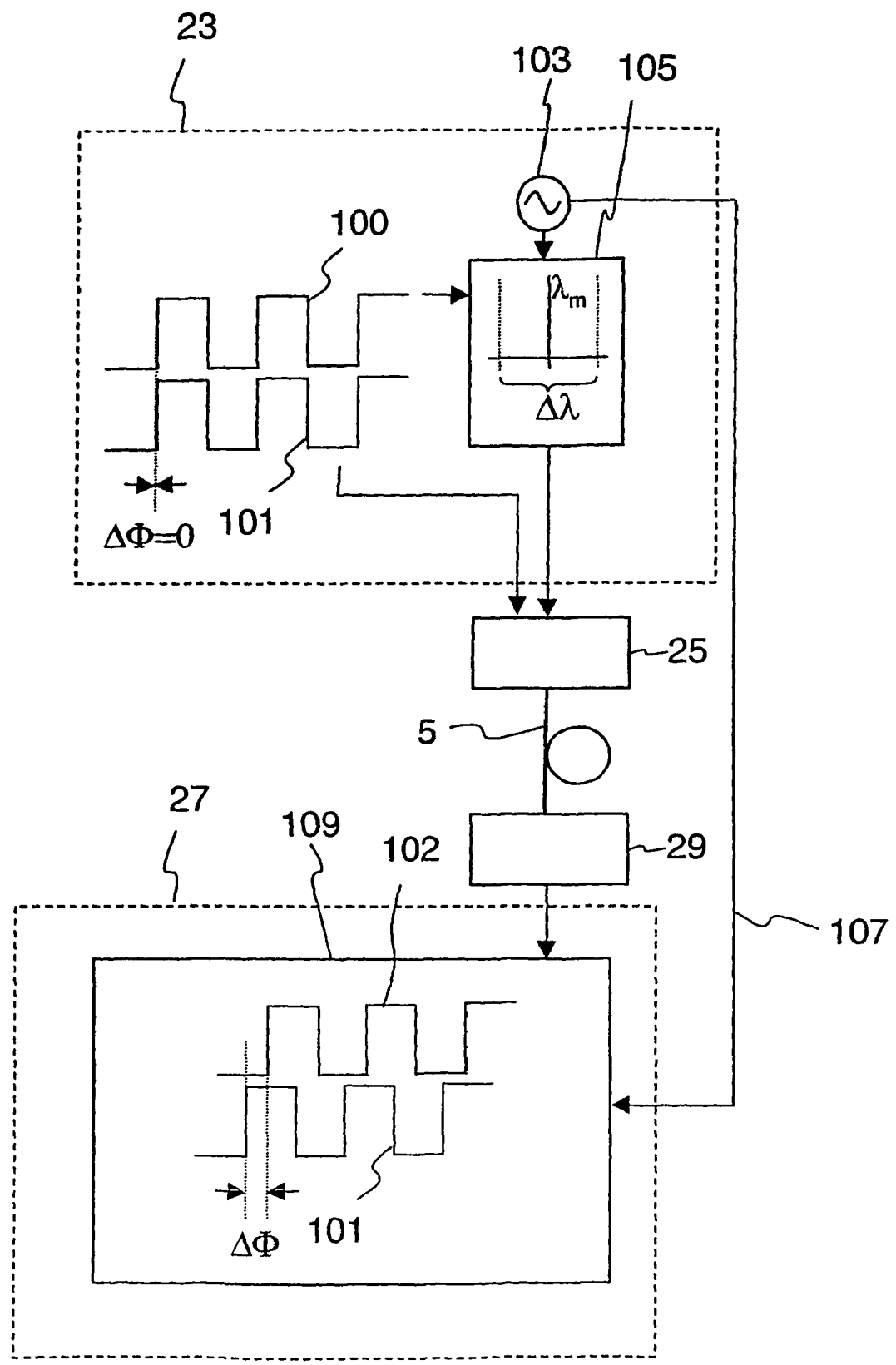
FIG. 2 illustrates an exemplary embodiment for determining chromatic dispersion by measuring differential phase shift.

In this instance, the method for measuring the differential phase shift of wavelength-modulated test signals is particularly suitable for measuring the chromatic dispersion using test signals. One possible arrangement for implementing this method in a specific embodiment of an optical transmission link as shown in FIG. 1B is depicted schematically in FIG. 2. In this case, a narrow-band test signal 102 is modulated periodically around a mid-wavelength. This is accomplished, for example, by filtering a broader-band test signal 100 through a modulated filter or a modulator 105 such as an oscillating grating. This test signal 102 is then coupled, together with a reference signal 101, via coupler 25 into the transmission link. In addition, both signals are suitably modulated over time. To that end, the signals preferably include a sequence of pulses such as, in particular, square-wave pulses.

Because of the chromatic dispersion, a change in the relative temporal position of the pulses of test signal 102 and reference signal 101 then results during the transmission of these signals, which manifests as a phase shift between the pulses. CD monitor 27 is then able to detect this with high accuracy with the aid of a synchronized amplifier, i.e., lock-in amplifier 109. The value of the chromatic dispersion with respect to the mid-wavelength of the test signal is then yielded from such a phase shift $\Delta\Phi$.

However, the lock-in method requires synchronization between the test-signal generator and the CD monitor. To permit measurement of the phase shift in synchronized fashion, the modulation frequency and modulation phase are needed by the lock-in amplifier, e.g., in the form of a signal corresponding to the modulation of the test signal. To that end, for instance, test-signal generator 23 includes a modulation-frequency generator 103. Modulator 105 is then controlled, i.e., narrow-band test signal 102 is modulated, with the modulation frequency generated by modulation-frequency generator 103. At the same time, the modulation frequency of generator 103 is transmitted via an optical monitoring channel 107 to the lock-in amplifier. In this context, because of the small amount of information content, monitoring channel 107 may have a very narrow-band design. The monitoring channel may be implemented via a separate line, but may equally also be transmitted as a narrow-band frequency band via the optical transmission line.

From these measurements, a suitable signal corresponding to the chromatic dispersion may then be generated, which is transmitted to the temperature-control device of the OCET.

Optical time domain reflectometry (OTDR) measurements or transit-time photon counting, among others, are also suitable for determining the chromatic dispersion with the aid of test signals. Both methods are based on transit-time measurements of optical signals.

FIG. 1C shows a further generalized exemplary embodiment of an optical transmission link 1. Here, receiver 7 has two optically transparent elements 40 and 41, of which one element 40 is disposed upstream and element 41 is disposed downstream of the OCET along the optical path. Naturally, one of the elements 40, 41 may also include an optical amplifier, for example.

Any optical elements in which an optical signal is transported in optically transparent fashion or processed are understood to be optically transparent elements. Examples of such optically transparent elements are optical amplifiers, optical multiplexers and demultiplexers, optical filters, optical add/drop multiplexers and glass-fiber elements, as well as combinations of such elements. In the same way, of course, an OCET according to the present invention represents such an optically transparent element. In any case, optical signals which pass through optically transparent elements are subject to the chromatic dispersion of the transparent or partial material of these elements.

Figure 3:
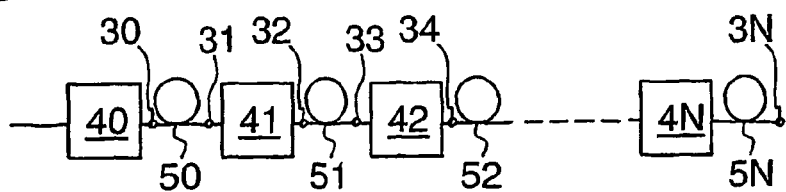
FIG. 3 illustrates a schematic representation of an optically transparent path.

Accordingly, an OCET is able to stabilize the chromatic dispersion of any given optical path, as is depicted, for example, in FIG. 3, within a certain range of occurring fluctuations of the dispersion. An optically transparent path, as shown in FIG. 3, includes an arrangement of successive, optically transparent elements 40, 41, . . . , 4N and transmission fibers 51, 52, . . . , 5N. The dispersion may be determined at one or more of the measuring points 50, 51, . . . 5N.

In general, a transmission fiber may also be made up of a plurality of fibers, arranged one after the other, which also include different materials and may therefore exhibit different chromatic dispersions, as well.

Figure 4:
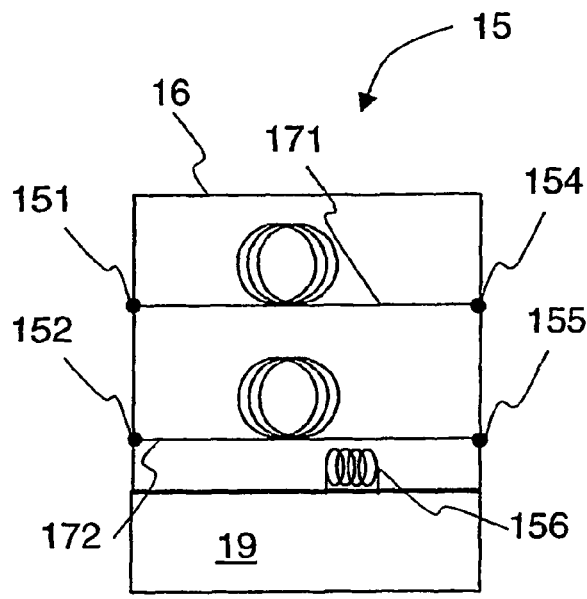
FIG. 4 illustrates a specific embodiment of an OCET having a plurality of optical elements.

FIG. 4 shows a further specific embodiment of an OCET 15. It is distinguished by the fact that it has more than one dispersion-compensating optical element. Regarding this, the exemplary specific embodiment shown in FIG. 4 has two dispersion-compensating fibers 171, 172. Fibers 171 and 172 each have separate inputs 151, 152 and outputs 154, 155 that are connectable to individual parallel branches of an optical transmission system. Fibers 171 and 172 are accommodated in a shared temperature chamber 16. The temperature in temperature chamber 16 is then able to be adjusted by temperature-regulating device 19 with the aid of heating device 156. In this way, the temperatures of both fibers 171 and 172 are adjusted together. In a simple manner, such an OCET is thus able to simultaneously stabilize the chromatic dispersion of a plurality of parallel branches of an optical transmission system.

Figure 5:
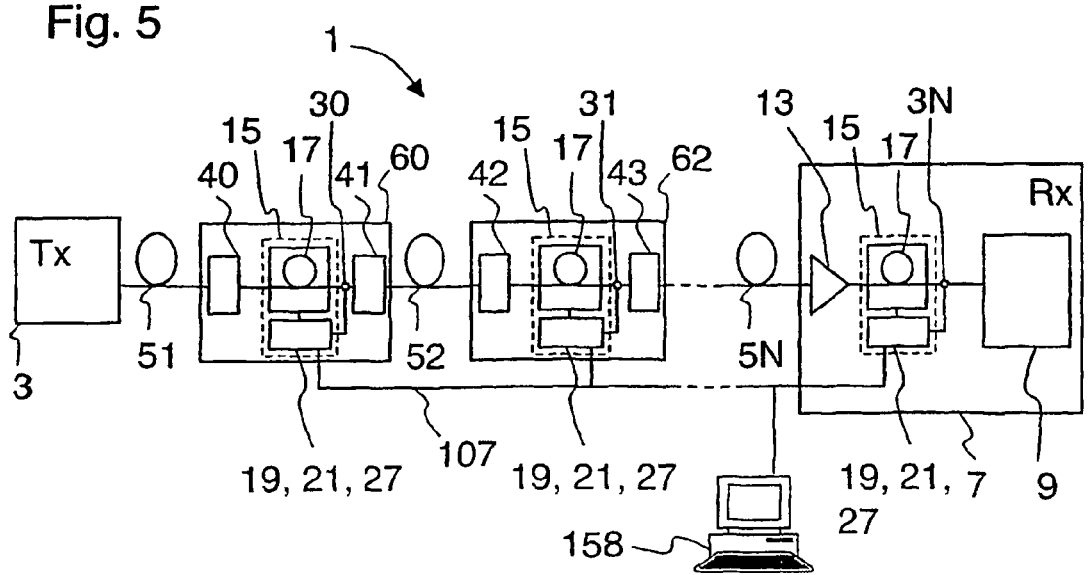
FIG. 5 illustrates another specific embodiment of an optical transmission link.

In the following, reference is made to FIG. 5 which shows a further exemplary specific embodiment of a dispersion-stabilized, optical transmission, i.e., a transmission link 1.

This specific embodiment includes a plurality of optical network elements 60, 62, . . . , that are situated between transmitter 3 and receiver 7 along the optical transmission path between optical transmission fibers 51, 52, . . . , 5N.

For their part, optical network elements 60, 62, . . . each again include one or more optically transparent elements. In addition, the network elements, as well as receiver 7, each include an OCET 15. In addition to a temperature-control device 21, the specific embodiment of the OCETs shown here also includes a CD monitor 27 which, in each case, determines the chromatic dispersion at one of allocated measuring points 30, 31, . . . 3N. Naturally, CD monitors 27 may also be disposed as separate components, similarly as indicated in FIG. 1B. Temperature-control devices 21 of OCETs 15 are interconnected among each other via an optical control channel or optical monitoring channel 107. For that purpose, optical monitoring channel 107 is preferably bidirectional and may, for example, also be realized via a fixed telephone line or an IP connection.

Thus, the settings of the other OCETS transmitted via the optical monitoring channel are added here to the measured values of the chromatic dispersion, determined by the respective CD monitors, as input parameters for temperature control devices 21. Similarly, in one embodiment, the measured values of the chromatic dispersion ascertained by respective CD monitors 27 are transmitted via the channel 107 to a central computing device 158, is also advantageous. It is then able to ascertain the best settings of the OCETs and transmit signals corresponding to these settings back to OCETs 15 via optical monitoring channel 107.

What is claimed is:

1. A device for adjusting the chromatic dispersion in an optical transmission system, the device comprising:
    an optical element having a temperature-dependent chromatic dispersion, the optical element disposed along an optical transmission path within a receiver;
    a device for measuring an ambient temperature of at least one section of the optical element to generate a measured value;
    a device for adjusting at least one of a temperature and a temperature distribution of at least one region of the optical element for providing a predefined chromatic dispersion of the optical element, the device adjusting in response to the measured value, wherein the device for adjusting includes a heating device, and
    at least two devices for adjusting the chromatic dispersion of the optical transmission system that are disposed one after the other along the optical path being connected via an optical monitoring channel to a computer device for ascertaining the settings of the device.

2. The device of claim 1, wherein the optical element includes a material that exhibits an essentially monotonic dependence of the chromatic dispersion upon its temperature.

3. The device of claim 1, wherein the optical element includes a material which exhibits a dispersion coefficient that has an inverted sign compared to the dispersion coefficient of the optical transmission system.

4. The device of claim 1, wherein the optical element includes an optical fiber and the optical fiber is a glass fiber.

5. The device of claim 1, wherein the device for adjusting at least one of the temperature and the temperature distribution includes a thermostat device.

6. The device of claim 1, further comprising:
    a chromatic dispersion monitor operative to measure chromatic dispersion.

7. The device of claim 1, further comprising:
    at least two optical elements having a temperature-dependent chromatic dispersion, which are assigned to separate inputs and outputs; and
    the device for adjusting at least one of a temperature or a temperature distribution operative to adjust a joint temperature or temperature distribution of at least one region of the at least two optical elements.

8. The device of claim 1, wherein the optical element is provided to overcompensate a value of the chromatic dispersion of the transmission system to be reached, so that in response to suitable temperature increases, the value is reached.

9. The device of claim 8, wherein the optical element includes a material which exhibits a dispersion coefficient having an inverted sign compared to the dispersion coefficient of the optical transmission system.

10. An optical transmission system, comprising:
a transmitter for transmitting an optical signal;
a receiver for receiving the optical signal from the transmitter, the transmitter coupled to the receiver via an optical element defining an optical path, wherein the optical element includes a temperature-dependent chromatic dispersion; and
at least one device, disposed within the receiver, for adjusting the chromatic dispersion of the optical element, the device including:
a device for measuring an ambient temperature of at least one section of the optical element to generate a measured value;
a device for adjusting at least one of a temperature and a temperature distribution of at least one region of the optical element for providing a predefined chromatic dispersion of the optical element, the device adjusting in response to the measured value, wherein the device for adjusting includes a heating device, and
at least two devices for adjusting the chromatic dispersion of the optical transmission system that are disposed one after the other along the optical path being connected via an optical monitoring channel to a computer device for ascertaining the settings of the device.

11. The system of claim 10, wherein the transmitter includes:
a device for feeding a test signal for measuring the chromatic dispersion.

12. The system of claim 10, wherein the receiver includes:
at least one device for measuring the chromatic dispersion.

13. The system of claim 10, wherein the heating device regulates the temperature as a function of a signal that corresponds to the measured value of the chromatic dispersion.

14. A method for adjusting the chromatic dispersion in an optical transmission system, comprising:
measuring an ambient temperature of at least one section of the optical element having a temperature-dependent chromatic dispersion, the optical element disposed along an optical transmission path within a receiver;
generating a measured value based on the measured ambient temperature; and
adjusting, in response to the measured value, at least one of a temperature and a temperature distribution of at least one region of the optical element for providing a predefined chromatic dispersion of the optical element, wherein the adjusting is effected using a temperature chamber so that the ambient temperature of the at least one section of the optical element and its surroundings are negligable, wherein at least two devices for adjusting the chromatic dispersion of the optical transmission system that are disposed one after the other along the optical path being connected via an optical monitoring channel to a computer device for ascertaining the settings of the device.

15. The method of claim 14, wherein the chromatic dispersion in the optical transmission system is measured and at least one of the temperature and the temperature distribution is adjusted as a function of the measurement.

16. The method of claim 15, wherein the adjusting the at least one of a temperature and a temperature distribution of the optical element is as a function of the adjustment of at least one further element having a temperature-dependent chromatic dispersion in the optical transmission system.

17. The method of claim 14, wherein the chromatic dispersion in the optical transmission system is ascertained by measuring the temperature at at least one location in the optical transmission system.

18. The method of claim 14, wherein the step of adjusting further comprises:
compensating for the chromatic dispersion in the optical transmission system.

19. The method of claim 14, further comprising:
ascertaining the chromatic dispersion of the at least one section of the optical transmission system by feeding and evaluating a test signal.

20. The method of claim 19, further comprising:
measuring a differential phase shift of a wavelength-modulated test signal for determining the chromatic dispersion.

* * * * *